(12) United States Patent
Kang et al.

(10) Patent No.: US 7,575,076 B2
(45) Date of Patent: Aug. 18, 2009

(54) LINK-TYPE DOUBLE TRACK MECHANISM FOR MOBILE ROBOT

(75) Inventors: Sung-chul Kang, Seoul (KR); Gyeong-cheol Shin, Gyeonggi-do (KR); Woo-sub Lee, Seoul (KR); Chang-woo Park, Gyeonggi-do (KR)

(73) Assignee: Korea Institute of Science and Technology, Seoul (KR)

( * ) Notice: Subject to any disclaimer, the term of this patent is extended or adjusted under 35 U.S.C. 154(b) by 263 days.

(21) Appl. No.: 11/568,411

(22) PCT Filed: Apr. 30, 2004

(86) PCT No.: PCT/KR2004/001026

§ 371 (c)(1),
(2), (4) Date: Apr. 9, 2007

(87) PCT Pub. No.: WO2005/105388

PCT Pub. Date: Nov. 10, 2005

(65) Prior Publication Data

US 2008/0011525 A1      Jan. 17, 2008

(51) Int. Cl.
*B62D 55/02* (2006.01)
(52) U.S. Cl. .................. 180/9.34; 280/5.2; 280/5.22
(58) Field of Classification Search ........... 180/9.34, 180/9.32; 280/5.2, 5.22
See application file for complete search history.

(56) References Cited

U.S. PATENT DOCUMENTS

| | | | | |
|---|---|---|---|---|
| 3,166,138 A | * | 1/1965 | Dunn, Jr. ................. | 180/9.23 |
| 3,288,234 A | * | 11/1966 | Feliz .......................... | 180/6.5 |
| 4,709,773 A | * | 12/1987 | Clement et al. ............ | 180/9.32 |
| 4,993,912 A | | 2/1991 | King et al. | |
| 5,117,930 A | | 6/1992 | Argouarc'h | |
| 6,263,989 B1 | * | 7/2001 | Won ......................... | 180/9.32 |
| 6,431,296 B1 | * | 8/2002 | Won ......................... | 180/9.32 |
| 6,523,629 B1 | * | 2/2003 | Buttz et al. ................ | 180/167 |
| 6,668,951 B2 | * | 12/2003 | Won ......................... | 180/9.1 |

FOREIGN PATENT DOCUMENTS

JP          63-222982          9/1988

OTHER PUBLICATIONS

English Language Abstract of JP 63-222982.

* cited by examiner

*Primary Examiner*—Christopher P Ellis
*Assistant Examiner*—Michael R Stabley
(74) *Attorney, Agent, or Firm*—Greenblum & Bernstein, P.L.C.

(57) ABSTRACT

The present invention relates to a design of a driving mechanism for a vehicle to move through uneven terrain including stairways. The link-type double track mechanism in accordance with the present invention comprises: front and rear track driving sections; a built-in type control box; a set of angle-adjusting flippers, installed at front and rear ends of the control box, for adjusting the track angle; and high-speed driving wheels installed at the angle-adjusting tracks and imbedded inside. The link-type double track mechanism in accordance with the present invention does not require a complex terrain-adaptation mechanism, and thus it has advantages that the overall structure is simple and the control is very easy.

16 Claims, 10 Drawing Sheets

LINK-TYPE DOUBLE TRACK MECHANISM FOR MOBILE ROBOT

TECHNICAL FIELD OF THE INVENTION

The present invention relates to a design of a driving mechanism for a vehicle to move through uneven terrain including stairways.

DESCRIPTION OF THE PRIOR ART

For achieving the mobility on uneven terrain, the conventional mechanisms in the prior art used to add extra devices and actuators to modify the shape of a track to be suitable for the terrain shape. However, this kind of mechanism has disadvantages that the overall structure is being complicated and the energy efficiency is being lowered. Moreover, the driving speed is being decreased due to the shape change of a track, and the control on the actuators becomes to be more complicated.

DESCRIPTION OF THE INVENTION

The present invention is proposed to solve the problems mentioned above. It is therefore the object of the present invention to provide a driving mechanism for a tracked vehicle to have good adaptability to uneven terrain such as stairways without any extra devices or actuators.

DETAILED DESCRIPTION OF THE EMBODIMENTS

Hereinafter, referring to appended drawings, the structures and the operation principles of the embodiments of the present invention are described in detail.

The present invention relates to a driving mechanism applicable to a vehicle able to move through uneven terrain including stairways.

Figure 1:
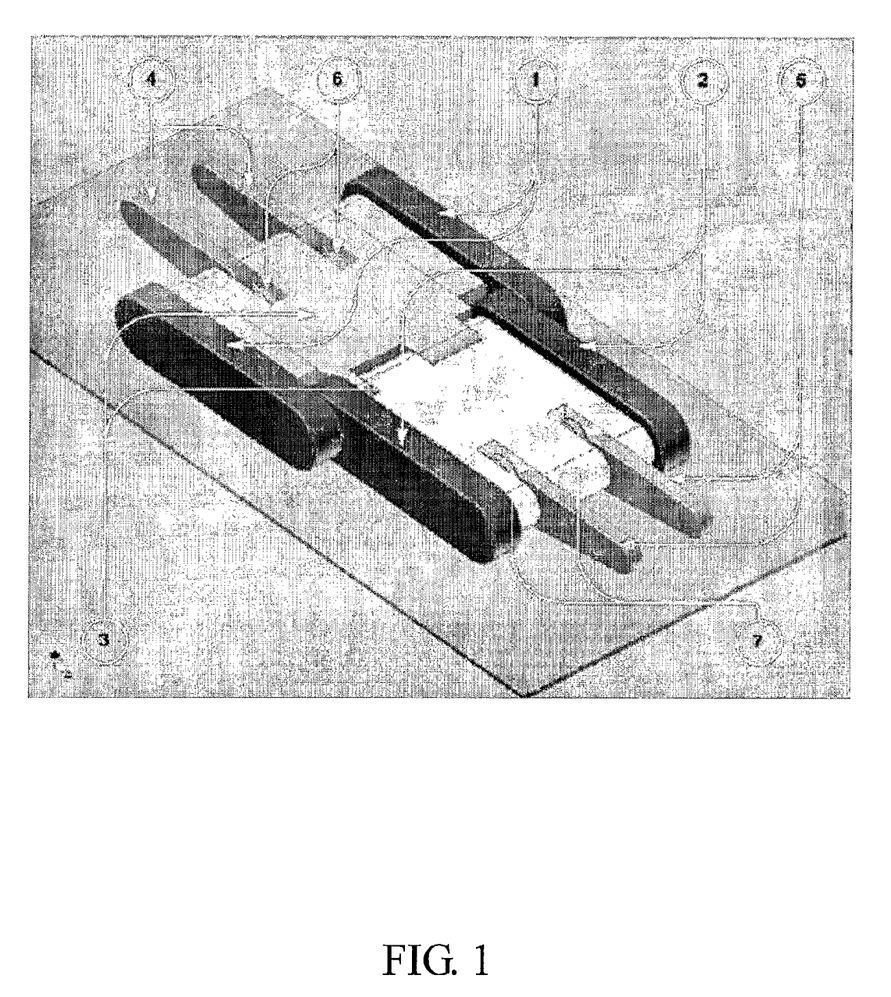
FIG. 1 is a view illustrating the overall structure of a link-type double track mechanism in accordance with the present invention.

As described in FIG. 1, the link-type double track mechanism in accordance with the present invention comprises: front and rear track driving sections (1, 2); a built-in type control box (3); a set of angle-adjusting flippers (4, 5), installed at front and rear ends of the control box, for adjusting the track angle; and high-speed driving wheels (6, 7) installed at the angle-adjusting flippers and imbedded inside.

Track driving sections (1, 2) are attached to a shaft connected to a driving pulley, which actuates both track sections (1, 2) simultaneously, by a rotational joint, and thus they can be rotated freely. With using the free rotation ability, the track device of the present invention can be passively adapted to the terrain surface by gravity without any extra actuator. Consequently, the mobility on uneven terrain such as stairways has been remarkably improved.

Figure 2:
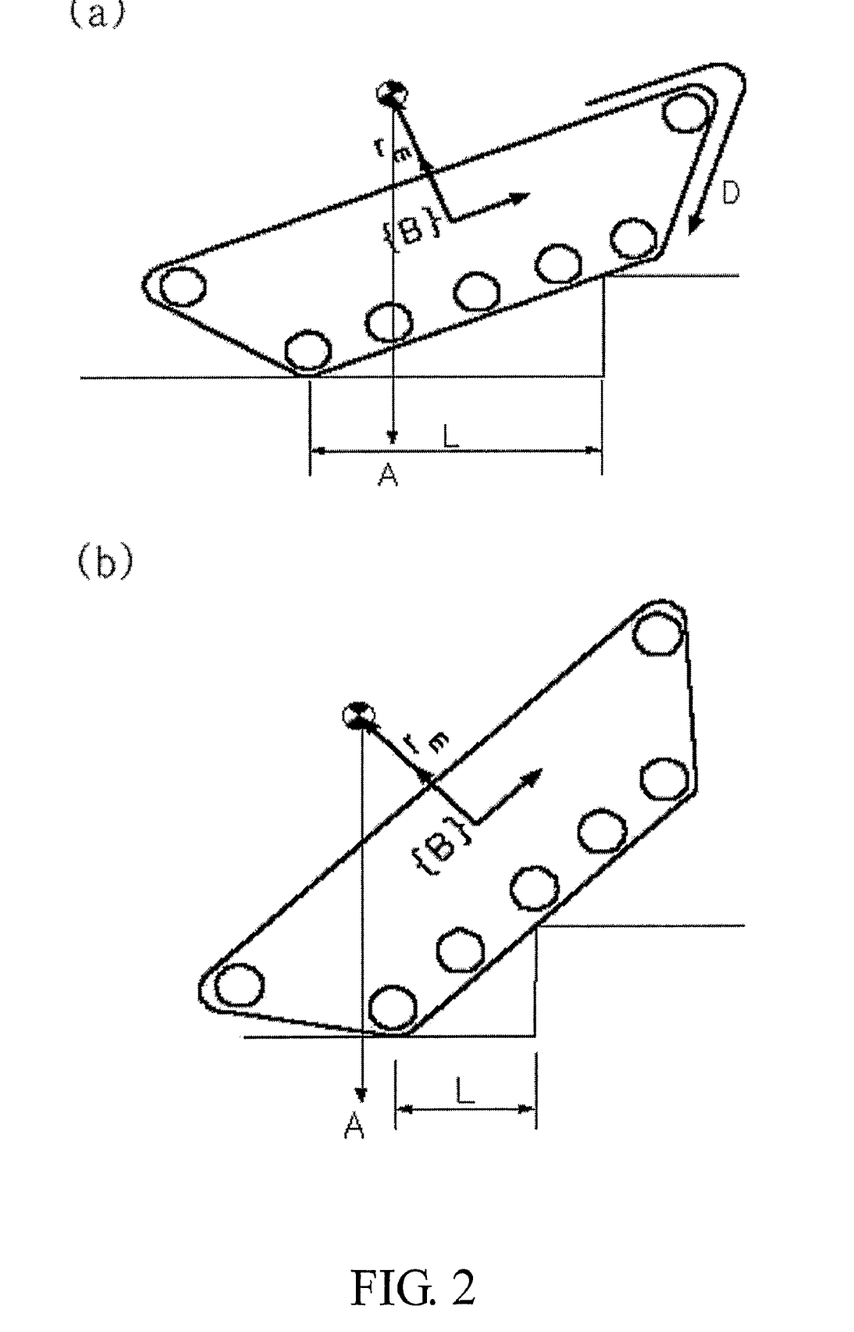
FIG. 2 is a view illustrating an example of a single-tracked vehicle climbing a stairway.

FIG. 2 shows the example of instability occurring when a vehicle having a single-track mechanism, like a tank, is being driven over a stair. In the figure, D represents the rotation direction of the track and {B} represents a body fixed coordinate frame. And, $r_m$ represents a position vector of the center of gravity in {B} or the zero-moment-point (ZMP) in dynamic viewpoint. L represents the supporting area of the track section. Here in FIG. 2, since the overall structure is being described in two-dimensional plane, L is described as a straight line. A represents the projection of the center of gravity of the vehicle or the zero-moment-point (ZMP) in dynamic viewpoint to the supporting area. For stable movement of a vehicle, A should be remained within L. FIG. 2(A) shows the initial state of climbing a stair. In the figure, A is remained in L so that the vehicle can move stably. On the other hand, in FIG. 2(B), A goes beyond the range of L, and thus the vehicle is being turned-over.

Even with a single-track mechanism, if the hump is not so high and/or the center of gravity is very low, turning-over situation can be prevented. However, there is a mechanical design-limit in lowering the center of gravity of a vehicle, and the heights of the humps in the working-field are usually uneven. Consequently, a vehicle having a single-track mechanism cannot avoid having a restriction in its mobility.

Figure 3:
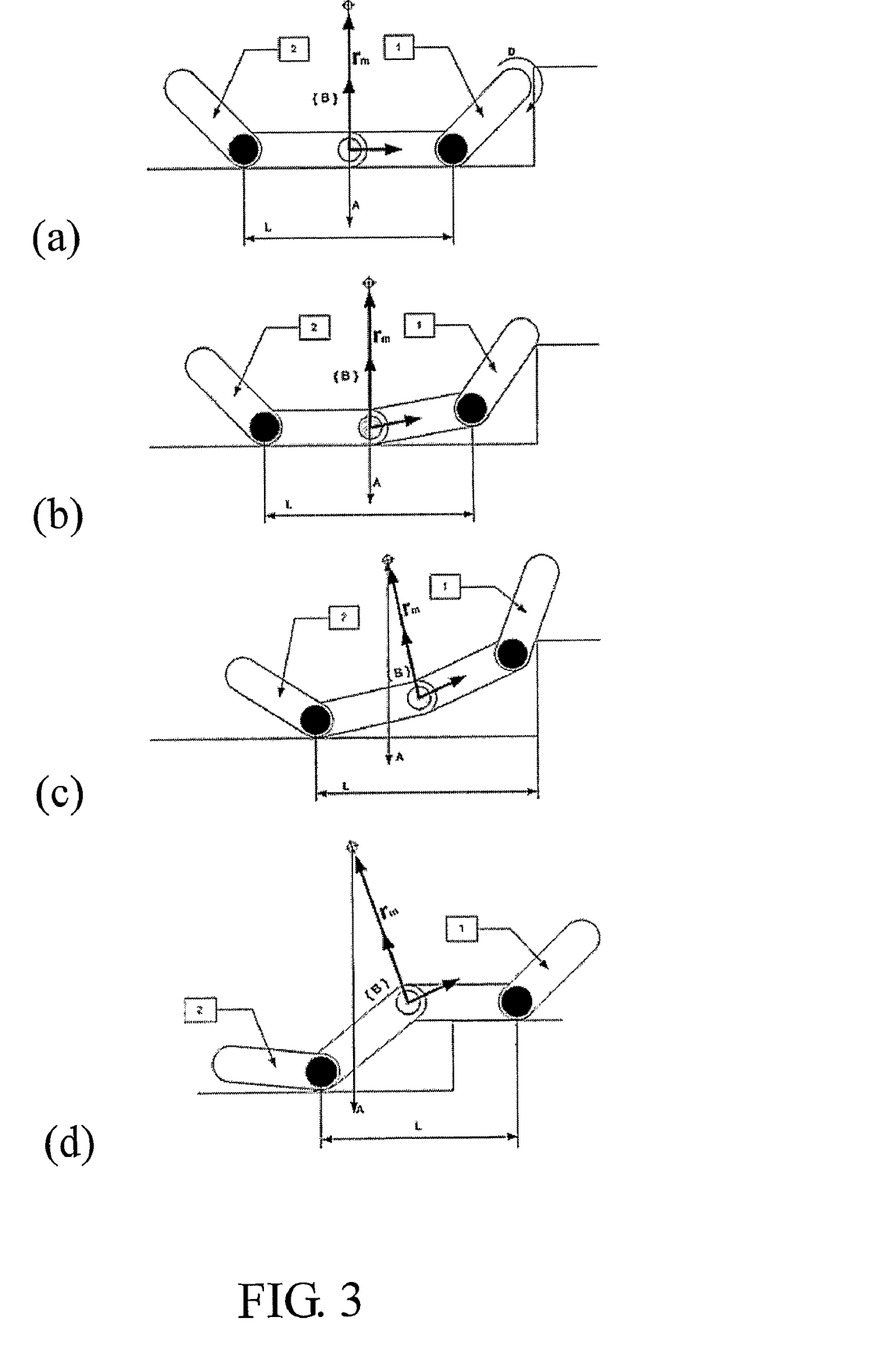
FIG. 3 is a view illustrating an example of a vehicle with link-type double track mechanism climbing a stairway.

FIG. 3 shows an example of a vehicle with link-type double track mechanism in accordance with the present invention climbing a hump. The figure shows a vehicle climbing over a hump in the sequence of (A)~(D), and the reference signs represent the same as those in FIG. 2. FIG. 3(B) shows that the track section (1) moves over the hump along the wall with being rotated to the shaft of driving pulley (7). FIG. 3(C) describes the state that, when the relative movement of the track sections (1, 2) is being stopped by the rotational angle limitation mechanism, both track sections (1, 2) are being rotated to the ground simultaneously just like a single-tracked vehicle. FIG. 3(D) shows the effect of enlarging the length of L when the track section (1) completely climbs over the hump.

With this feature, a vehicle with link-type double track mechanism in accordance with the present invention can overcome the unstable situation described in FIG. 2. This kind of terrain adaptability is the advantage of multi-joint driving section, however, if the number of joints is increased, the structure becomes to be more complicated. Besides, if a user wants to give terrain adaptability like in FIG. 3(D) to a conventional 2, 3-tracked vehicle using extra actuators, it requires large amount of circumstantial information and the control of the vehicle becomes very difficult. Thus, the vehicle cannot move with high-speed. The present invention constitutes the track sections (1, 2) with passive-type joints to be passively adapted to the ground for simplifying the structure and the control. With this structure of passive adaptability, the vehicle can move with high-speed without a control for terrain-adaptation by a user.

Figure 4:
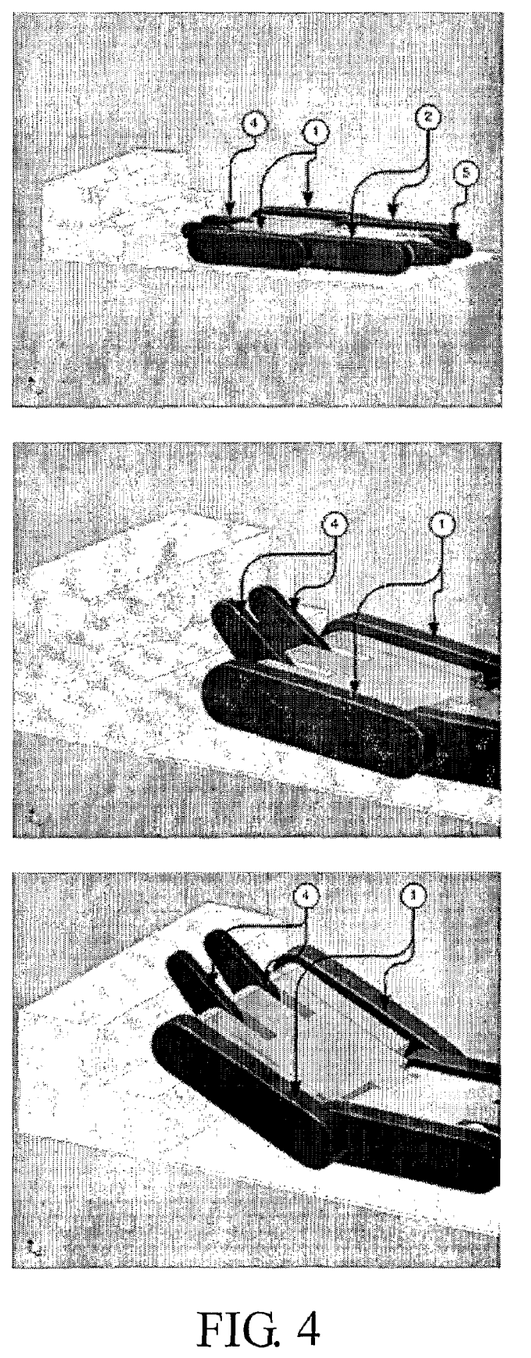
FIG. 4 is a view illustrating the steps of climbing stairways with using an angle-adjusting flipper.

FIG. 4 shows the steps of climbing stairways of a track mechanism using an angle-adjusting flipper. As shown in FIG. 4(A), when a track mechanism meets a stair, the height of the mechanism is lower than that of the stair, and thus it cannot climb over the stair in an ordinary way. To overcome this kind of height difference, the mechanism first adjusts the angle of the angle-adjusting track of the flipper, installed at the front side of the track, in order for the height of the front-end of the track to be higher than that of the stair as shown in FIG. 4(B), and then approaches to the stair. Once the driving track (1) climbs over the stair by using these sequences, the mechanism takes the angle-adjusting flipper back to its original position as shown in FIG. 4(C), and then continues climbing the stairs. In general stairway-climbing cases, the driving tracks (1, 2) are climbing over the stairways with being adapted to the stairway shape with maintaining the angle-adjusting flipper to be in the fixed position.

Figure 5:
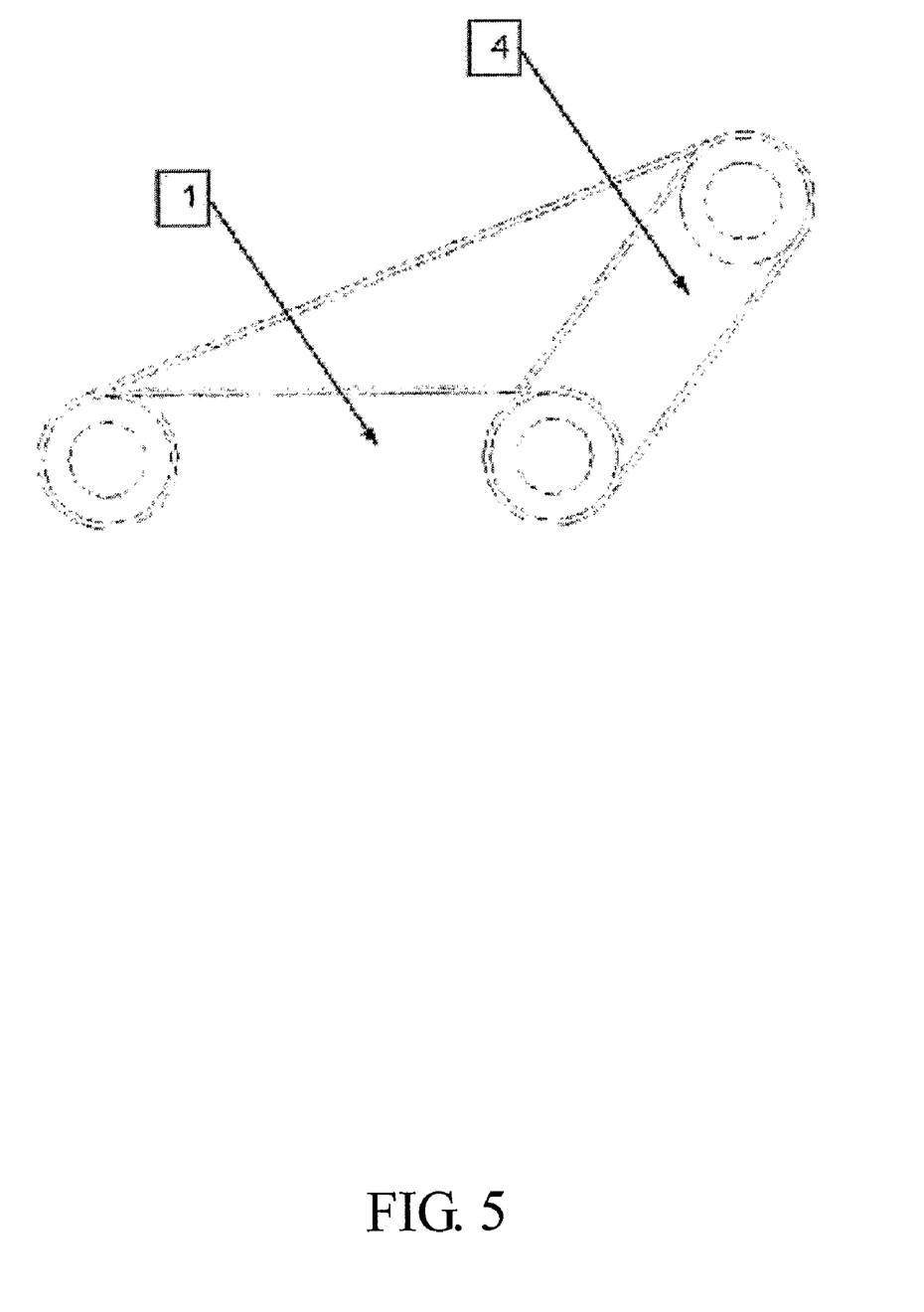
FIG. 5 is a view for comparing the structure of an angle-adjusting flipper with that of a triangular track.

In case that the driving track (1) and the angle-adjusting flipper (4) are fixed with a certain angle as shown in FIG. 5, the track mechanism is working in the same manner as that of a fixed triangular track. In general, it is most effective to use a driving track (1) and an angle-adjusting flipper (4) in combination for being adapted to various terrain types, however, if the vehicle can move around with the angle-adjusting flipper being fixed with a certain angle in a specific terrain, the driving track (1) and the angle-adjusting flipper (4) can be replaced by a triangular track, as shown in FIG. 5, for simplifying the track mechanism.

Figure 6:
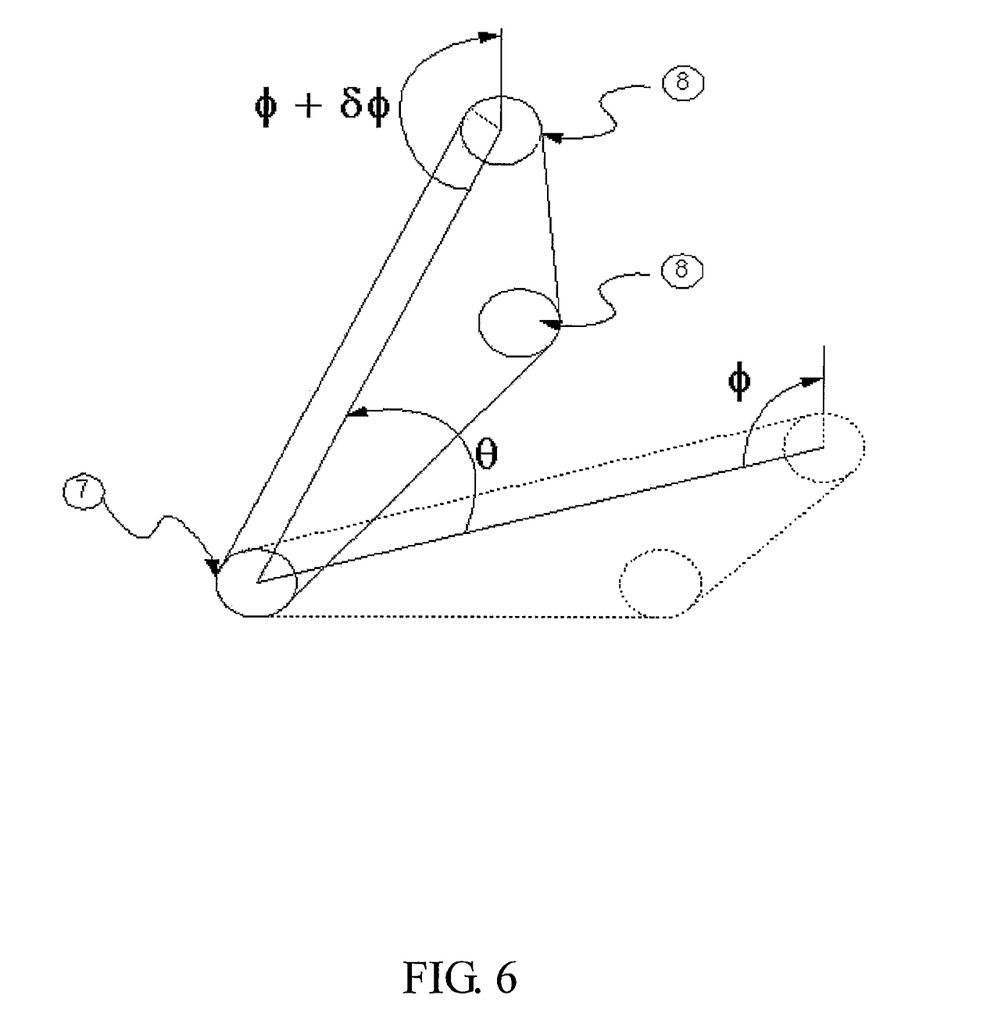
FIG. 6 is a view illustrating the relative movements of two tracks.

FIG. 6 shows the movement of idle pulley (8) caused by the relative movement of the track sections (1, 2) in case of applying a fixed triangular track described in FIG. 5. As shown in the figure, regardless tkof the driving pulley (7) being fixed or being moved, the relative rotation between two track frames can be occurred. In case that the driving pulley (7) is being fixed, if the track section is being rotated, the idle pulley (8) is being rotated. Thus, the relative movement is resistance-free even if the driving pulley (7) is being fixed. Here, the rotation amount of idle pulley (8) is calculated by multiplying the rotation variance of track section to the diameter ratio of the driving pulley (7) and the idle pulley (7), as depicted in Equation 1.

$$\phi_\theta = \phi + \delta\phi = \phi + k\theta, \text{[Equation 1]}$$

where $\phi$ is the rotation angle of idle pulley (8) changed by driving pulley (7), and $\delta\phi$, which is represented by $k\theta$, is a value linearly dependent upon the relative rotation variance ($\theta$) of the track sections (1, 2).

Figure 7:
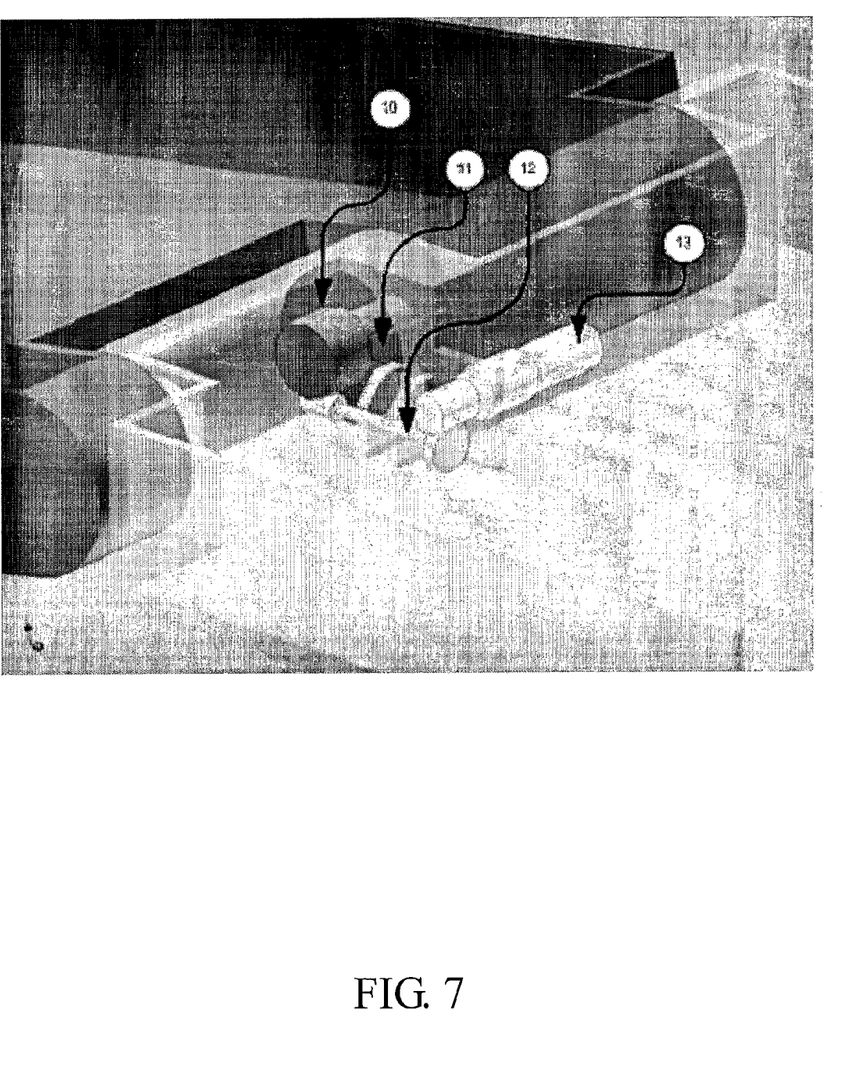
FIG. 7 is a view illustrating the structure of a rotation angle limitation mechanism.

FIG. 7 shows the structure of rotation angle limitation mechanism installed in-between free rotational shafts connecting the bodies of driving tracks (1, 2). In FIG. 7, a supporter (11) is connected to the driving track (1) and a stopper (10) is installed at the driving track (2), however, the installing location is not limited as such. In general driving operation, the supporter (11) does not contact with the stopper (10) within its moving range so that free rotation can be carried out. But, when a torque generated by a motor (13) installed at the body of driving track (2) rotates the angle of the stopper (10) by a gear (12), the rotation range of the supporter (11) is being limited. In addition, if a user rotates the stopper (10) more than a preset angle, it rotates even after contacting with the supporter (11), and thus the user can modify the angles between the driving tracks (1, 2) to be a desired angle.

Figure 8:
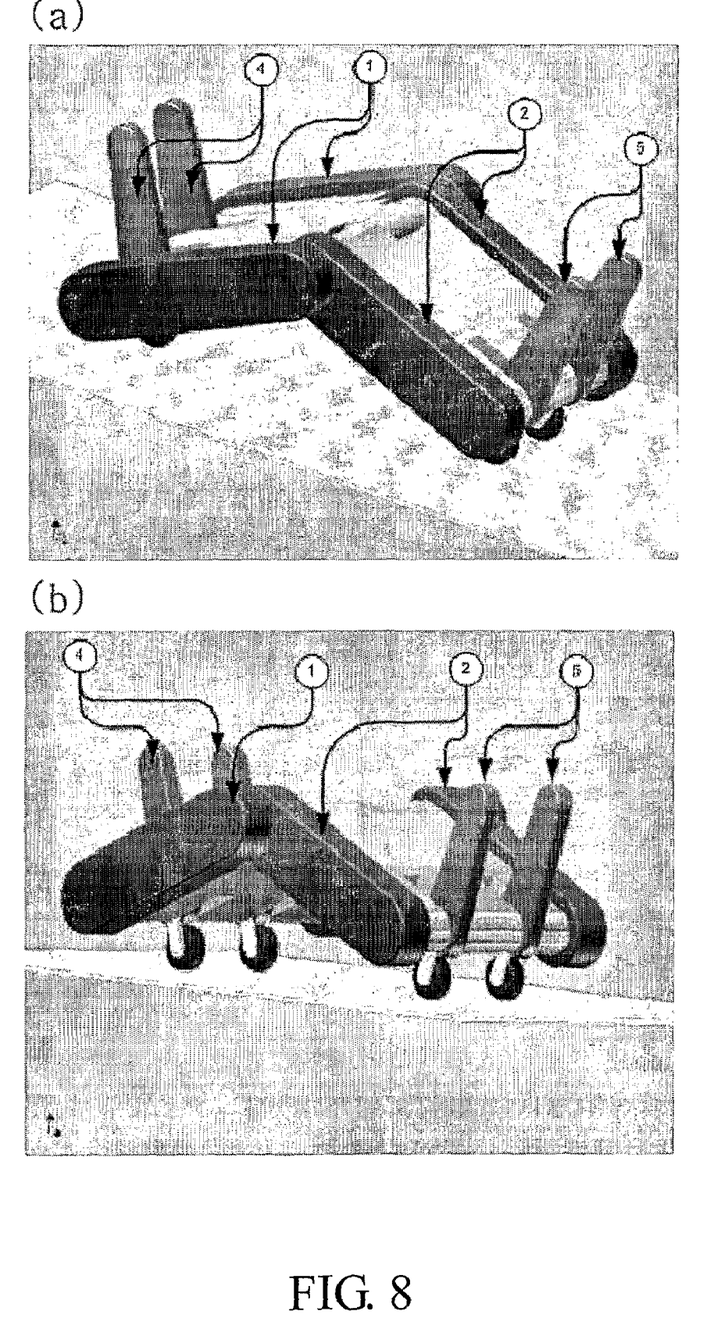
FIG. 8 is a view illustrating the high-speed driving mode mechanism.

FIG. 8 shows a modified mechanism for high-speed driving mode for overcoming the large frictional force caused by high-speed movement of track-type mechanism. When the angle-adjusting flippers (4, 5) are remained within a usual angular range for being adapted to uneven terrain, the built-in type high-speed driving wheels are not being operated. However, as shown in FIG. 8, if the angle-adjusting flippers (4, 5) are folded beyond a specific angle, the built-in type high-speed driving wheels come out from the body. At this time, if a user actuates a break installed at the self-rotation shaft between the driving tracks (1, 2) and rotates the angle-adjusting flippers (4, 5) continuously, the driving tracks (1, 2) are to be off the ground and the high-speed driving wheels are being contacted to the ground alone. Thus, the vehicle can move faster in this mode compared with the ordinary track mode.

Figure 9:
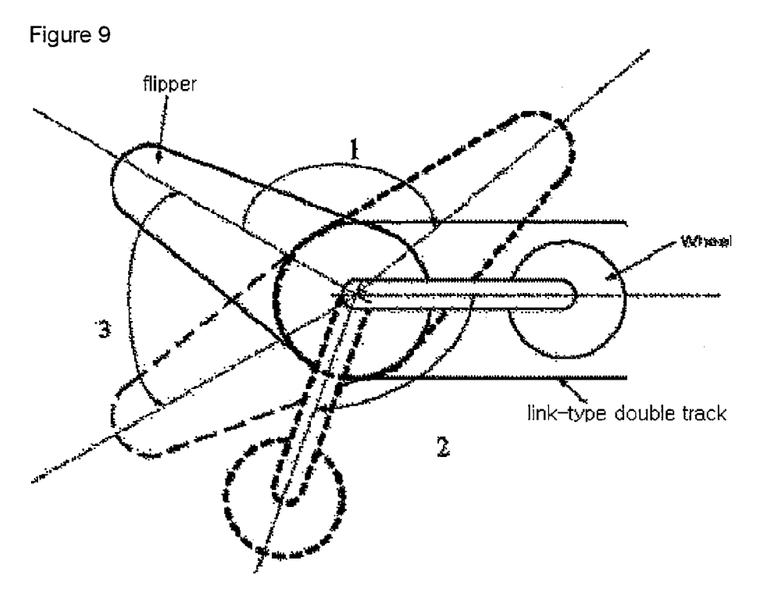
FIG. 9 is a view for explaining the driving mechanism of the angle adjusting flipper and the high-speed driving wheel.

FIG. 9 is a view for detailed explanation on the driving mechanism of the angle-adjusting flippers and the high-speed driving wheels described in FIG. 8. If the angle-adjusting flippers are moving within a usual angular range (3), the built-in type high-speed driving wheels are not being operated. The usual angular range (3) includes sufficient angles for the vehicle to climb on various stairways in general. If the angle-adjusting flippers are rotating into the angular range (1), the built-in type high-speed driving wheels start to come out from the body. At this time, the angular movement of the angle-adjusting flippers in the angular range (1) is the same as that of the high-speed driving wheels in the angular range (2).

Figure 10:
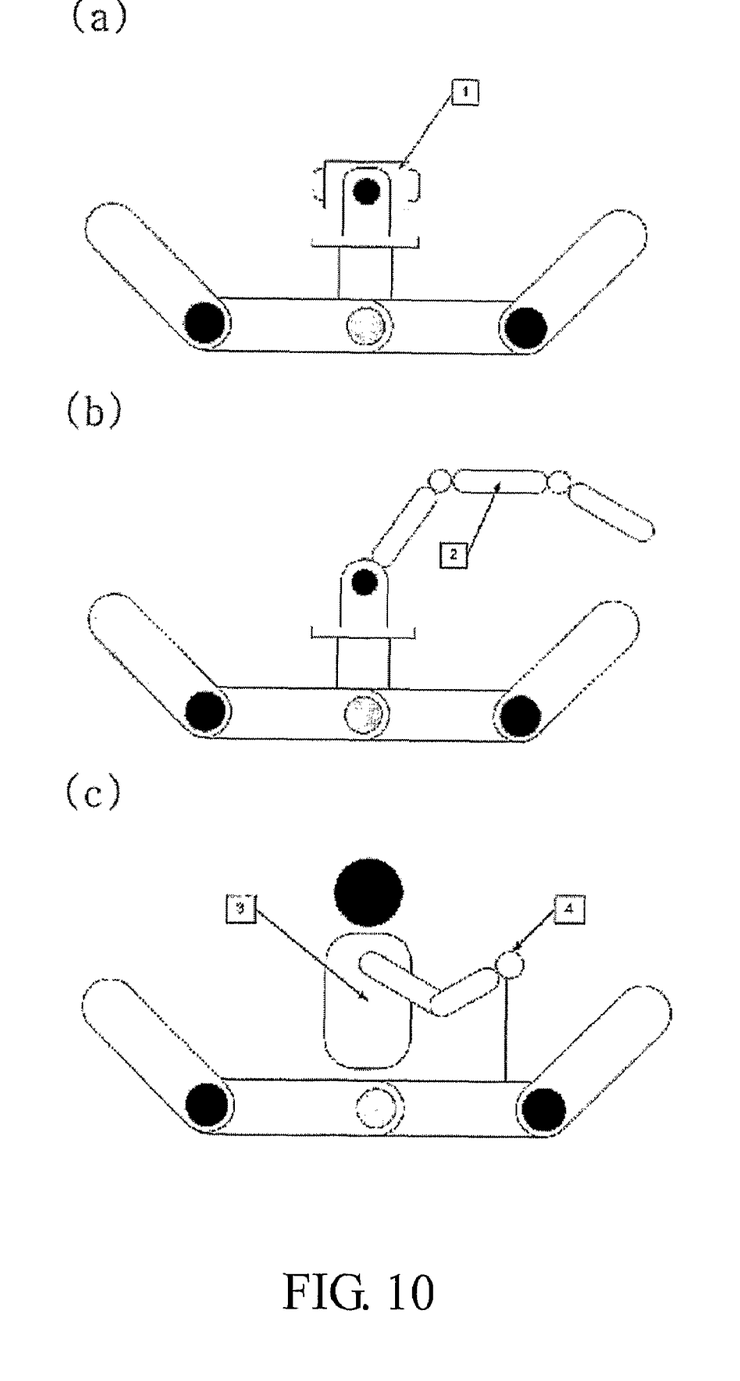
FIG. 10 is a view illustrating the application examples of the present invention.

FIG. 10 shows various application examples of the present invention wherein a pan-tilt-camera (1) or a robot arm (2) is installed thereon for being used for a remote-controlled robot. FIG. 10(C) shows an application example for a military and/or a leisure utility vehicle wherein a driver (3) is on board to drive the vehicle using a control lever (4).

Since those having ordinary knowledge and skill in the art of the present invention will recognize additional modifications and applications within the scope thereof, the present invention is not limited to the embodiments and drawings described above.

INDUSTRIAL APPLICABILITY

As mentioned thereinbefore, a link-type double track mechanism in accordance with the present invention does not require a complex terrain-adaptation mechanism, and thus it has advantages that the overall structure is simple and the control is very easy. A robot, the above-mentioned link-type double track being applied thereto, can be applicable for the civil use such as a lifesaver on a fire, a remote inside-monitor for a building, a substitute machine for police-work, a detector for a nuclear reactor, and/or an assistant for a disabled person as well as the military use such as a mine detector and/or a mine eliminator, a detector for enemy's territory, and so on. In addition, the present invention can be actively applied to developing a service robot available for inside and/or outside of a building. Besides, in case of being designed as a vehicle, it can be applicable for a military scouting vehicle as well as a civil utility vehicle to create an import-replacing effect and/or an export increasing effect.

What is claimed is:

1. A link-type double track apparatus for high-speed driving on uneven terrain comprising:
    a front track section (1) and a rear track section (2) capable of relative rotational movement;
    a built-in type control box;
    a set of angle-adjusting flippers, installed at front and rear ends of said control box with high-speed driving wheels being installed, for adjusting the track angle;
    a structure for reducing the ground contact areas of said track sections; and
    a structure for limiting the relative rotational movement range of said track sections,
characterized in that, said apparatus has vertically symmetric structure so that it can be moved normally even when it is being turned over during a drive;

said apparatus can be passively adapted to the ground surface by gravity without having any extra actuator by using free relative rotational movement of said front and rear tracks; and said apparatus can be driven with high-speed in some specific terrain by using said high-speed driving wheels installed therein.

2. A link-type double track apparatus for high-speed driving as claimed in claim 1,
characterized in that all the mechanical movement ranges required for a drive are designed to be the same in the upward direction and the downward direction.

3. A link-type double track apparatus for high-speed driving as claimed in claim 2,
characterized in that said apparatus has vertically symmetric external shape.

4. A link-type double track apparatus for high-speed driving as claimed in claim 1,
characterized in that said front track section and said rear track section are connected to each other by a conventional rotation joint.

5. A link-type double track apparatus for high-speed driving as claimed in claim 4,
characterized in that said front track section and said rear track section are driven by two driving pulleys, attached to a power transmission shaft, respectively, and said rotation joint is installed for said front track and said rear track to perform relative rotational movement centering around said power transmission shaft.

6. A link-type double track apparatus for high-speed driving as claimed in claim 5,
characterized by further comprising a driving section, including an actuator and a reducer, installed in each of said track sections.

7. A link-type double track apparatus for high-speed driving as claimed in claim 1,
wherein said structure for reducing the ground contact areas of said track sections is constituted by installing an actuator at said rotation joint section for actuating a relative rotation in-between said track sections to lift up the center of relative rotation between said track sections from the ground surface to reduce the ground contact areas of said track sections.

8. A link-type double track apparatus for high-speed driving as claimed in claim 7,
wherein said actuator installed at said rotation joint section contains a driving section including a motor, a reducer, and a worm gear.

9. A link-type double track apparatus for high-speed driving as claimed in claim 1,
said structure for limiting the relative rotational movement range of said track sections is constituted by installing a supporter (11) at the front-track-side of a rotation movement shaft, which is connected in-between said front and rear track sections and able to perform a relative rotational movement, and a stopper (10) at the rear-track-side of said rotation movement shaft for limiting the relative rotation range of said front track section by the contact of said supporter and said stopper.

10. A link-type double track apparatus for high-speed driving as claimed in claim 9,
characterized in that said stopper is connected to a driving section so that the rotation angle can be controlled.

11. A link-type double track apparatus for high-speed driving as claimed in claim 10,
characterized in that the rotation range of a rotation joint for relative rotation of said front and rear track sections can be controlled by changing the relative angle of said stopper to said supporter.

12. A link-type double track apparatus for high-speed driving as claimed in claim 1,
characterized in that said angle-adjusting flippers, with high-speed driving wheels being installed, have three selective modes of:
a ground contact mode of maintaining the tracks of said flippers to contact the ground surface to obtain a driving contact force and assist the straight movement in case of driving on a usual plain surface;
an angle-maintain mode of maintaining the tracks of said flippers with a certain angle, suitable for corresponding terrain, to perform a driving guide function for overcoming the height difference in case of driving on any uneven terrain such as stairways; and
a high-speed driving mode of popping out said high-speed driving wheels to contact the ground surface for high-speed driving by rotating said flipper more than a specific preset angle.

13. A link-type double track apparatus for high-speed driving as claimed in claim 12,
characterized in that said flippers performing a driving guide function can be controlled its relative angle to said front track section so that an appropriate guiding angle can be selected for the terrain to be moved on.

14. A link-type double track apparatus for high-speed driving as claimed in claim 12,
characterized in that said high-speed driving wheels remain inside with said flippers moving within a general angle range for ordinary drive guiding, and when said flippers are rotating beyond a specific rotation angle limit, said high-speed driving wheels pop outside to contact the ground surface by an internal link structure.

15. A link-type double track apparatus for high-speed driving as claimed in claim 1,
characterized by constituting a power transmission shaft for said high-speed driving wheels inside the rotation shaft of rotation tracks and matching the rotation center of said two shafts so that the power transmission from an actuator to said high-speed driving wheels is always possible regardless of the angle of rotation tracks.

16. A link-type double track apparatus for high-speed driving as claimed in claim 15,
characterized in that an actuator installed at said front track section transmits the power to front and rear high-speed driving wheels in the left side and another actuator installed at said rear track section transmits the power to front and rear high-speed driving wheels in the right side.

* * * * *

UNITED STATES PATENT AND TRADEMARK OFFICE
CERTIFICATE OF CORRECTION

PATENT NO. : 7,575,076 B2
APPLICATION NO. : 11/568411
DATED : August 18, 2009
INVENTOR(S) : S. Kang et al.

It is certified that error appears in the above-identified patent and that said Letters Patent is hereby corrected as shown below:

On the Title Page, Item [75] Inventor, line 1, "Sung-chul Kang, Seoul (KR); Gyeong-cheol Shin, Gyeonggi-do (KR); Woo-sub Lee, Seoul (KR); Chang-woo Park, Gyeonggi-do, (KR)" should be -- Sung-chul Kang, Seoul (KR); Gyeong-cheol Shin, Gyeonggi-do (KR); Woo-sub Lee, Seoul (KR); Chang-woo Park, Gyeonggi-do (KR); Mun-sang Kim, Seoul, (KR) --

Signed and Sealed this

First Day of December, 2009

David J. Kappos
*Director of the United States Patent and Trademark Office*